United States Patent [19]
Ishida

[11] 3,798,671
[45] Mar. 19, 1974

[54] CAMERA SHUTTER MECHANISM COMBINED WITH CONTROL CIRCUIT
[75] Inventor: Hiroaki Ishida, Chiba, Japan
[73] Assignee: Seiko Koki Kabushiki Kaisha, Tokyo, Japan
[22] Filed: Apr. 5, 1973
[21] Appl. No.: 348,309

[30] Foreign Application Priority Data
Apr. 6, 1972 Japan.............................. 47-039880

[52] U.S. Cl................................................ 354/226
[51] Int. Cl. ............................................ G03b 9/58
[58] Field of Search ......... 95/53 R, 53 E; 339/17 M

[56] References Cited
UNITED STATES PATENTS
3,468,235 9/1969 Rittman................................. 95/53

Primary Examiner—Samuel S. Matthews
Assistant Examiner—Michael L. Gellner
Attorney, Agent, or Firm—Robert E. Burns; Emmanuel J. Lobato

[57] ABSTRACT

The operating mechanism of a camera shutter is combined with an electrical circuit for controlling the operation of the shutter in the manner that a circuit board serves as one of the supporting plates for mounting movable parts of the operating mechanism. The circuit board comprises a plate of insulating material laminated with a metal layer, portions of which are selectively etched away to leave patterned portions comprising the circuit. Portions of the metal layer are also left to strengthen and protect the plate in areas where it is engaged by moving parts of the mechanism.

5 Claims, 2 Drawing Figures

3,798,671

CAMERA SHUTTER MECHANISM COMBINED WITH CONTROL CIRCUIT

FIELD OF INVENTION

The present invention relates to camera shutter mechanisms and particularly to cameras in which operation of the shutter is controlled by an electric circuit.

BACKGROUND OF THE INVENTION

In cameras which have an automatic shutter that is responsive to the brightness of the subject being photographed, the operation and the control of the shutter requires not only mechanical moving parts, but also an electrical control circuit. Customarily the control circuit comprises a circuit board which is separate and apart from the mechanical parts of the shutter operating mechanism. Thus, space is required for the mechanical parts and additional space is needed for the electrical circuitry, thereby making it difficult to reduce the size of the apparatus. Moreover, by reason of the number of parts which it is necessary to make and assemble, it is difficult to reduce the cost of the camera.

SUMMARY OF THE INVENTION

It is an object of the present invention to overcome the disadvantages of the constructions previously used in order to provide a shutter operating and control assembly which is more compact and less expensive to manufacture. In accordance with the invention, a support plate for supporting moving parts of the shutter mechanism is also a circuit board of the electrical circuit controlling the operation of the shutter. By thus integrating the shutter operating mechanism and the electrical control circuit for the shutter, it is possible to make the assembly more compact and at the same time less expensive by reducing the number of parts to be made and assembled.

BRIEF DESCRIPTION OF DRAWINGS

The objects, advantages and characteristics of the invention will be more fully understood from the following description and claims in conjunction with accompanying drawings which illustrate a preferred embodiment of the invention and in which:

DESCRIPTION OF PREFERRED EMBODIMENT

Figure 1:
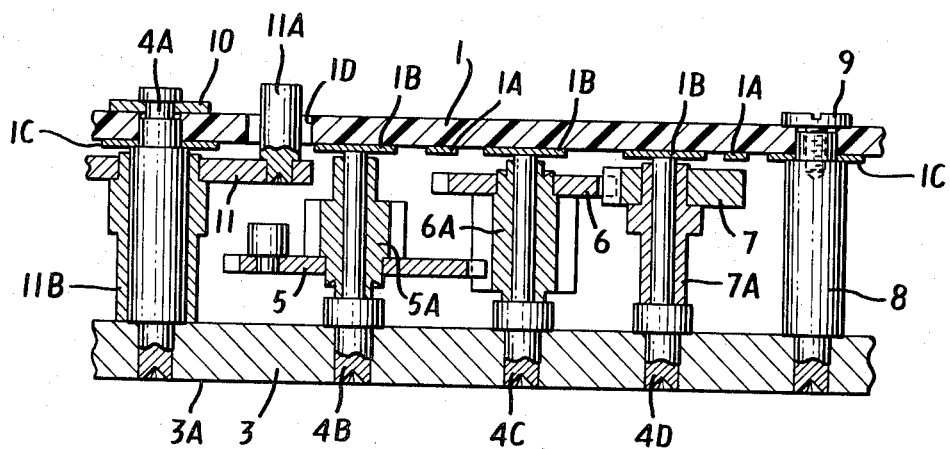
FIG. 1 is a partial cross sectional view of shutter operating mechanism and control circuitry in accordance with the invention.
Figure 2:
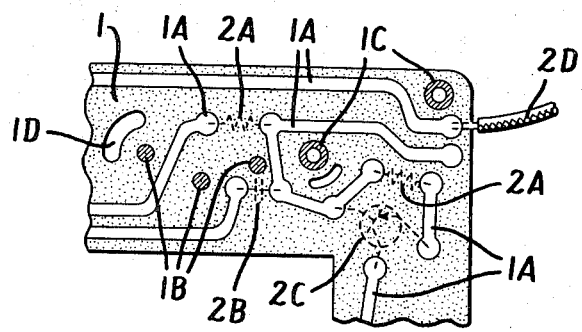
FIG. 2 is a partial plan view on a reduced scale of a circuit board forming part of the assembly of FIG. 1.

The shutter mechanism shown by way of example in the drawings comprises a number of moving parts disposed between a base plate 3 and a top plate 1. A plurality of fixed shafts 4A, 4B, 4C and 4D are fixedly secured in and project from the base plate 3. Each of the shafts is shown as having a shoulder engaging the inner face of the base plate and a shank portion fitting tightly in a corresponding hole in the base plate. The shafts are suitably secured in the base plate for example by staking, welding, soldering or screwing or with adhesive. A supporting post 8 is also secured to the base plate 3 in like manner.

Moving parts of the shutter operating mechanism are rotatably supported on the shafts 4A–4D. Thus a rotating part 11 having a sleeve portion 11B is rotatably mounted on the shaft 4A. A gear 5 having a pinion portion 5A is rotatable on the shaft 4B. A gear 6 having a pinion portion 6A is rotatable on the shaft 4C. A member 7 having a sleeve portion 7A is rotatable on the shaft 4D. The operating parts of the shutter mechanism may, for example, correspond to those disclosed in Kitai application Ser. No. 150,612 filed June 7, 1971. However, it will be understood that the present invention is also applicable to shutter operating mechanisms having different operating parts.

The several operating parts of the shutter operating mechanism are retained on the respective shafts by the top plate 1 which is provided with openings fitting over reduced end portions of the shaft 4A and the post 8. The top plate is removably secured in plate by a set screw 9 screwed into a tapped hole in the upper end of the post 8 and by a snap ring or washer 10 fitting into an annular groove provided in the upper end portion of the shaft 4A. The top plate 1 is provided with an arcuate slot 1D to receive an upwardly projecting portion 11A of the operating part 11. If desired, holes may be provided in the top plate 1 to receive upper end portions of shafts 4B, 4C and 4D. However, in the construction as shown in FIG. 1, these shafts abut the top plate but do not extend into it. The top plate thus provides thrust bearing surfaces for retaining the several rotating parts on their respective shafts.

The base plate 3 is formed of metal or other material having adequate strength and durability. Other parts may, if desired, be mounted on the opposite side 3A of the base plate. The top plate 1 is formed of plastic or other insualting material which in general will have less structural strength than the base plate 3. However, it is sufficiently strong to retain the operating parts of the mechanism in place as described above. On at least one face of the top plate 1, there is laminated a layer of copper or other suitable conductive material having a patterned configuration to provide conductors for an electrical circuit controlling the operation of the shutter. The circuit may for example be that of Kitai application Ser. No. 150,612 referred to above. However, other circuitry may be provided as desired. The metal layer 1A may be provided on the plate 1 of insulating material in any suitable manner, for example by covering the entire face of the plate 1 with a metal layer and then etching away portions to leave the patterned configuration desired. Alternatively, metal of the desired configuration may be punched from a sheet and appliqued onto the insulating plate 1. The components of the electrical circuit are soldered or otherwise connected to the conductors formed by the metal portions 1A. Thus, for example, resistors 2A, a capacitor 2B and a transistor 2C are suitably connected into the circuitry. Also a lead wire 2D is connected to one of the conductors formed by the metal portions 1A. The plate 1 thus forms a circuit board for the control circuit of the camera shutter. Other circuit components may, if desired, be disposed on the upper face of the plate 1.

In addition to the portions of the metal layer 1A which constitute conductors for the control circuit, other portions 1B of the metal layer are provided overlying the upper ends of the shafts 4B, 4C and 4D and the parts rotatable on the respective shafts. As the top plate 1 is usually made of a material of relatively low mechanical strength, for example plastic material, the metal portions 1B provide thrust bearing surfaces which increase the strength and wear resistance of the retaining plate 1. In like manner annular washer like areas 1C of the metal layer are provided around the holes in the top plate 1 which receive the upper ends of shaft 4A and post 8 respectively. Here again the metal provides a firm and wear resistant bearing surface. It will be understood that the metal layer portions 1B and 1C are formed in the same manner and simultaneously with the conductor portions 1A, for example by etching away portions of the metal layer while leaving other portions in a predetermined patterned configuration.

In addition to saving space and reducing the number of parts, the construction in accordance with the present invention facilitates assembly of the apparatus. After the shafts 1A–1D and post 8 are assembled in the base plate 3, the moving parts are slipped onto the respective shafts. The circuit board 1 on which the circuit components 2A–2C have been mounted is then placed over the assembled parts and secured by the set screw 9 and snap washer 10 thereby retaining all of the parts in place. As the circuitry is on the inner face of the plate 1, it is protected from damage. If at any time any repair or servicing is required either for the mechanical parts or for the circuitry, the plate 1 is readily removed, thereby providing access both to the mechanism and to the circuitry.

It will thus be seen that in accordance with the present invention the integration of the shutter operating mechanism and the shutter control circuitry results in a saving of space, parts and weight resulting in a more compact, lighter and less expensive camera.

While a preferred embodiment in accordance with the invention has been shown in the drawings and is herein particularly described, it will be understood that the invention is in no way limited to this embodiment. Thus, the number, design and arrangement of the moving parts and the particular circuitry employed for controlling the shutter mechanism may be varied according to the requirements of the particular camera in which the invention is used.

What I claim and desire to secure by Letters Patent is:

1. In a camera having a shutter, the combination of spaced support plates, one of said plates being of insualting material laminated on at least one surface with a conductive metal layer, a plurality of moving parts for actuating the camera shutter disposed between said plates and supported thereby, said conductive metal layer on said one support plate having a patterned configuration to define in part an electric circuit for controlling the operation of said shutter and electrical components mounted on said one support plate in conductive relation with selected points of said patterned metal layer to comprise therewith said control circuit for said shutter.

2. A combination as claimed in claim 1, in which said metal layer is on the inner face of said one support plate which faces the other of said support plates.

3. A combination as claimed in claim 2, in which portions of said metal layer overlie areas of said insulating material where said one plate is engaged by said moving parts to reinforce and protect said insulating material in said areas.

4. A combination as claimed in claim 1, in which at least some of said moving parts are rotatable on shafts which are fixed relative to and project from the other of said support plates.

5. A combination as claimed in claim 4, in which said one support plate is removably mounted on shafts fixedly projecting from said other support plate.

* * * * *